United States Patent
Levitsky et al.

(10) Patent No.: US 6,466,948 B1
(45) Date of Patent: Oct. 15, 2002

(54) TRAINABLE DATABASE FOR USE IN A METHOD AND SYSTEM FOR RETURNING A NON-SCALE-BASED PARCEL WEIGHT

(75) Inventors: Paul A. Levitsky, Monroe; Ronald P. Sansone, Weston, both of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/473,587

(22) Filed: Dec. 28, 1999

(51) Int. Cl.[7] .............................................. G06F 17/00
(52) U.S. Cl. ........................................ 707/104.1; 707/4
(58) Field of Search ................... 707/104.1, 4; 710/63; 705/400; 250/559.19

(56) References Cited

U.S. PATENT DOCUMENTS

| | | | | |
|---|---|---|---|---|
| 5,770,864 A | * | 6/1998 | Dlugos | 250/559.19 |
| 5,808,912 A | * | 9/1998 | Dlugos et al. | 364/562 |
| 5,869,819 A | | 2/1999 | Knowles et al. | 235/375 |
| 5,983,209 A | | 11/1999 | Kara | 705/407 |
| 6,041,318 A | * | 3/2000 | Danford-Klein et al. | 705/400 |
| 6,154,738 A | * | 11/2000 | Call | 707/4 |
| 6,282,590 B1 | * | 8/2001 | Ellis et al. | 710/63 |

* cited by examiner

Primary Examiner—Safet Metjahic
Assistant Examiner—Nguyen Camlinh

(74) Attorney, Agent, or Firm—Ronald Reichman; Angelo Chaclas; Paul A. Levitsky

(57) ABSTRACT

The invention is a method and system for determining a weight for use in a shipping application and for the establishment of a trainable weights database and a weight database training object. The method begins with establishing a database linked to the shipping application. The weight of a parcel to be shipped is determined by comparing a data entry at the shipping application with a set of data entries resident in the database. The comparison is performed by entering a description of the parcel to the system, and parsing the description to determine whether or not the data includes a known symbology or barcode. If it does, then the method matches the description with a locator function to locate the required weight; otherwise, the description is further parsed into match fields. If the comparison determines a weight, then the weight is returned to the shipping application for entry in an appropriate field; however, if the comparison does not return a weight, then a weight is determined by selecting an option from among a set of weight input options which includes an auto search mode. The determined weight is then input to the database in respect of a set of parameters resident in the data entry so that the determined weight can be used for subsequent transactions. Another aspect of the present invention, is a method of establishing and utilizing a weight database training object which is invoked to determine a weight to enter into the weight field of the shipping application.

38 Claims, 12 Drawing Sheets

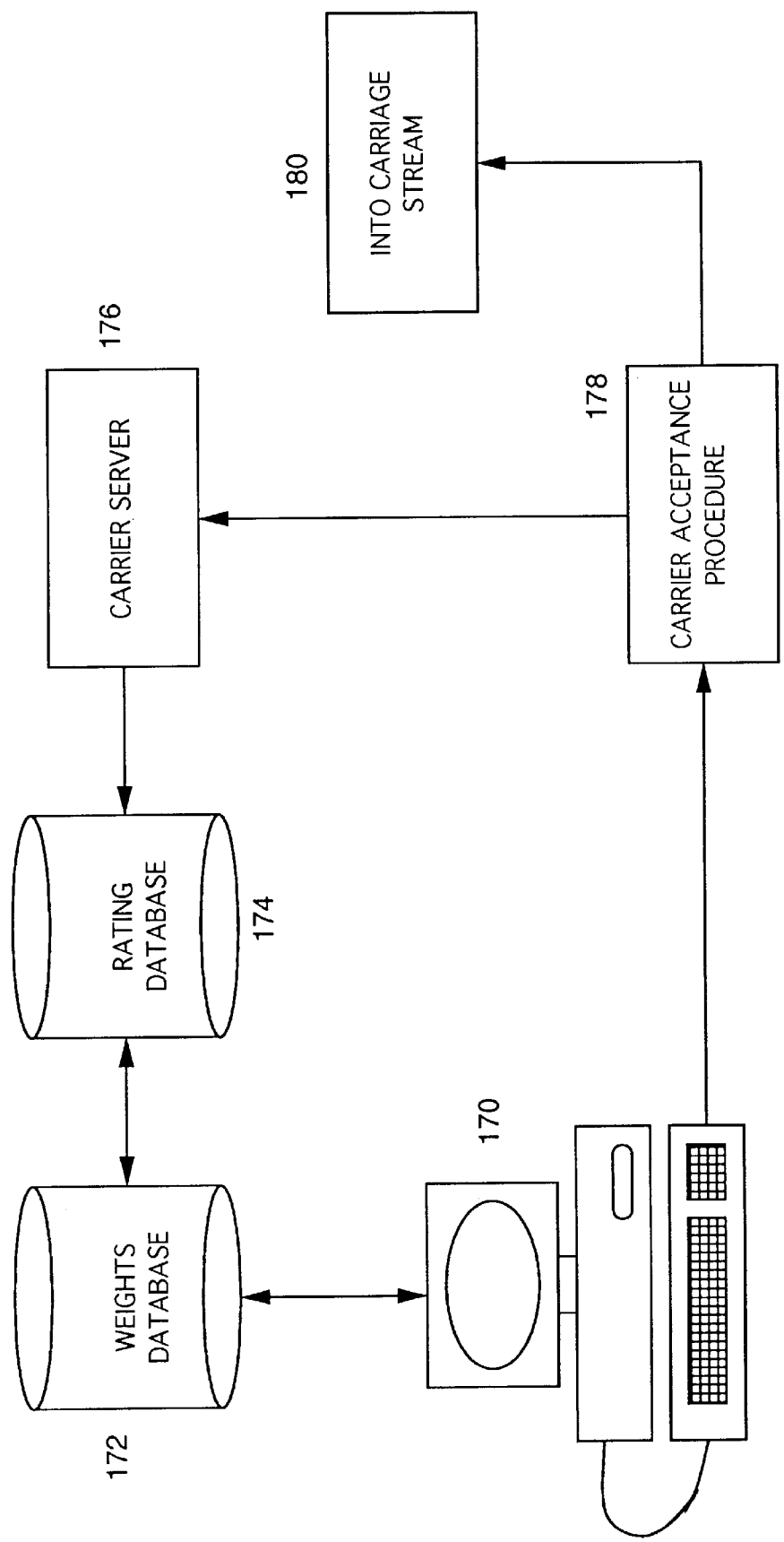

FIG. 5

| | INPUT INTERFACE | | |
|---|---|---|---|
| | WEIGHT 422 | MANUFACTURER 430 | PRODUCT DESCRIPTION 402 |
| UPC SYMBOL 412 | WEIGHT BY UNIT OF SIZE 424 | ADDRESS 432 | BY DIMENSION 404 |
| PARSE CODE TO DETERMINE PRODUCT DATA 414 | WEIGHT BY PACKAGE TYPE 426 | PRODUCT LINE DATA 434 | BY WEIGHT 406 |
| EAN SYMBOL 416 | WEIGHT BY PRODUCT TYPE 428 | INDUSTRY DATA 436 | PRODUCT CATEGORY 408 |
| OTHER SYMBOL TYPES 418 | | | 410 |

400

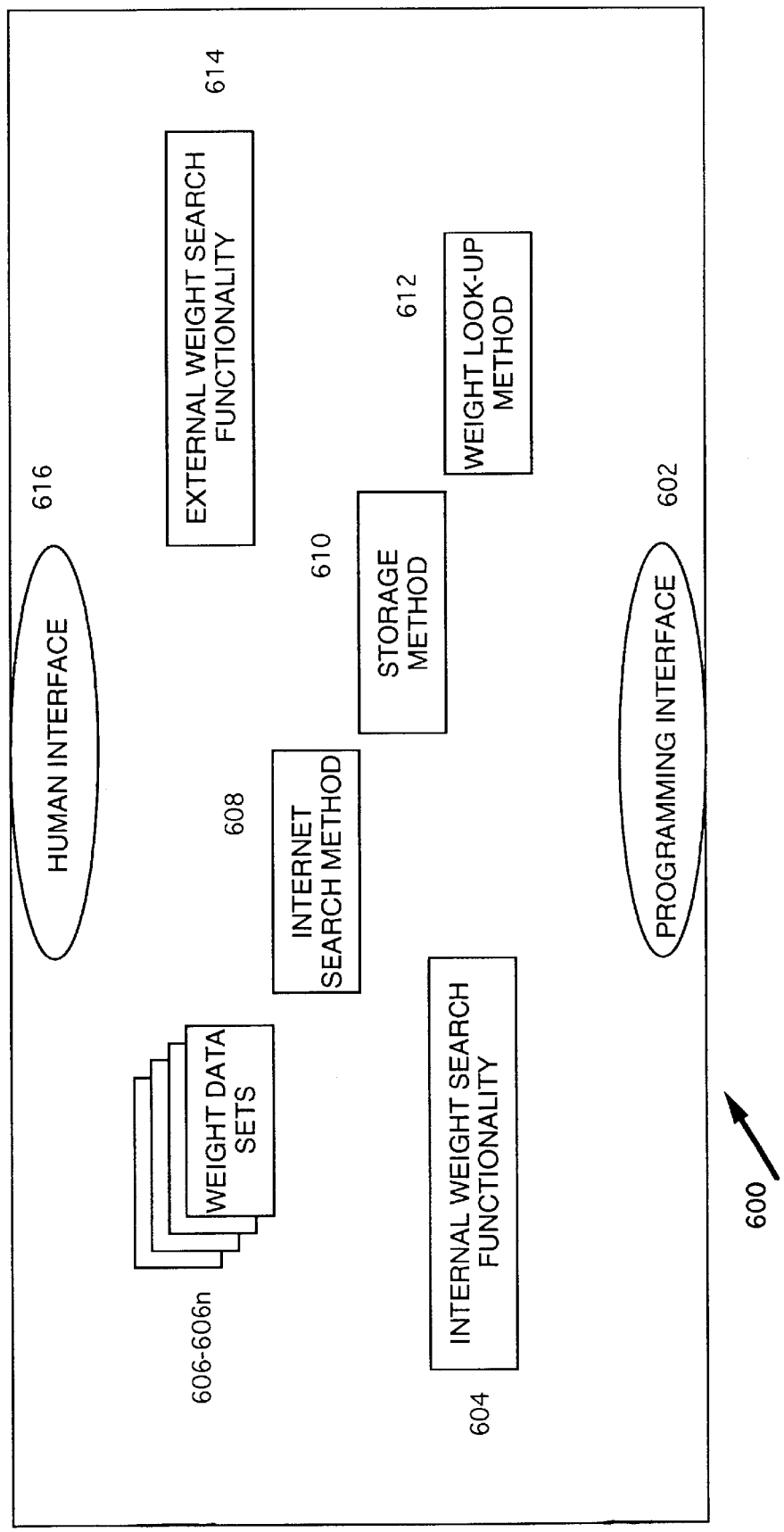

TRAINABLE DATABASE FOR USE IN A METHOD AND SYSTEM FOR RETURNING A NON-SCALE-BASED PARCEL WEIGHT

RELATED APPLICATIONS

Reference is made to Application Ser. No. 09473542 entitled A METHOD AND SYSTEM FOR RETURNING A NON-SCALE BASED WEIGHT, assigned to the assignee of this application and filed on even date herewith.

FIELD OF THE INVENTION

The present invention relates generally to the field of mail piece and/or parcel weighing and processing in a network; and, more specifically, to the field of determining the weight of an item for mailing or shipping through the use of an applied database in an internet or intranet data processing environment. The utilization of a trainable database to determine weight is further coupled with the ability of the system to access carrier rating and related functionality so as to provide convenient desktop shipping capability.

BACKGROUND OF THE INVENTION

As the capabilities of data processing systems has grown, so too have the requirements that are tasked to these systems. Greater speed in these systems has given rise to more detail-oriented applications. Greater memory capability has made memory intensive applications more attractive, and detailed applications have lead to more wide-spread use of previously inaccessible data processing abilities. With the spiraling growth in data processing ability, there has grown a need for more efficient ways of programming that promote speed as well as flexibility. Flexibility, in particular, allows applications that have been designed in varied programming languages, or operating on different platforms to be able to communicate without extensive system or file modification.

One such means of promoting flexibility within a data processing system is the use of "object-oriented" design (OOD). Object oriented programming languages are useful in removing some of the restrictions that have hampered application design due to the inflexibility of traditional programming languages.

OOD utilizes a basic element or construct known as the "object," which combines both a data structure and an intended behavior characteristic within the single element. Objects are bundles of data and the procedures which best identify the use of that data. Objects can be specific or conceptual and are often used to represent models of real-world object groupings; this has the effect of helping software applications become an organized collection of discrete objects in which data is held or moved based on the intended behavior of an object which is inherently unique. Each object knows how to perform some activity.

The objects interact and communicate with each other via messages. A message is initiated by one object for the purpose of getting a second message to perform an act such as performing the steps of a method. Information parameters may be passed along with the message so that the receiving object will have guidelines for performing its action.

Software objects share two characteristics; they all have "state" and "behavior." State is the condition of the object expressed in variables (what it knows), while behavior is implemented by performance of a method (what it can do). Packaging the object's variables, together with its methods, is referred to as "encapsulation." Encapsulation is used to hide unimportant implementation details from other objects; and, this in turn provides two primary benefits to software developers. These benefits are: (1) modularity and (2) information hiding.

Modularity of objects means that the source code for an object can be written and maintained independently of the source code for other objects, thus allowing a certain autonomy of purpose for each individual object. Information hiding, on the other hand, is the ability to keep private certain of its data and methods without effecting the other objects which may depend upon it. Common dependencies among objects can maintain communication by utilizing a public interface for information sharing.

Objects interact and communicate with each other though the use of messages. Each message has three components that are necessary for a receiving object to be able to perform a desired method; these are: (1) the object to whom the message is addressed; (2) the name of the method that is to be performed; and (3) the method required parameters. Because these three components alone represent what is required for methods to be activated, it is not required that objects be located within the same process in order for communication to take place. Message use, therefore, is the supporting means for object interaction. But to be of value to a particular application, objects must be able to be referenced.

Referencing is accomplished through indexing, addressing, or through value assignment which can be placed in a table for use as required. Objects can also be arranged by classification. Classification is based on groupings of objects based upon properties or characteristics important to an application or requirement. Each class describes a potentially infinite set of objects that comprise that class. Object interaction can be further optimized by the use of class distinction. Classes are organizational blueprints that define the variables and methods which are common to all objects of a particular group. Values for each of the variables are assigned and allocated to memory when an instance from a class is created. Additionally, methods can only be performed when a class instance has been allocated to memory. Thus, the most distinct advantage of class use is the ability to reuse the classes and thus further create more objects. Classes, in turn, can be subdivided into subclasses which inherit the state of the underlying class. The further advantage being the ability to create specialized implementations of methods.

The constant growth and expansion of software systems and the hardware platforms that support them has led to the emergence of object oriented programming which reduces time and memory capacity requirements by taking advantage of certain redundancies by treating them as unique software objects.

The advantages of objects lie in the ability of objects to link performance characteristics. This greatly optimizes the using system's ability to find data and use it effectively. Systems that utilize formats whose structure and requirements repeat, would benefit greatly from object oriented techniques. And, if the system were to be able to define its principle data requirements in the form of objects, it would inherit the advantages of the object oriented environment while maintaining the inherent system advantages.

OOD is known in the software arts and specific discussion of application design based upon OOD is not required for a thorough understanding of the applicant's claimed invention. It is, however, one object of the present claimed invention to disclose a method and system for utilizing object oriented design to effectively and efficiently link shipping, rating, and database search applications within a data processing system.

The technology afforded by faster and more memory-laden personal computer (PC) based data processing systems has allowed more and more functionality to get to the desktop. Desktop computing, followed by desktop publishing were among the first applications to reap the benefits of increased desktop capabilities. At present, the advances in the development of memory devices, such as hard disk drives, have allowed greater access to routine-intensive software that allows desktop users to produce work product that was being handled by mid-frame computers in the recent past.

The extensive development and advances that have guided the growth of the personal computer and its related systems has run a parallel course over the past decade with the explosive growth of the internet. Systems that can utilize the internet effectively provide their users with greater desktop power by accessing data that was previously unavailable or available only through traditional research vehicles. Thus, personal computing power has grown explosively.

As personal computing power has grown, so to has the variety of business related applications that have come to the desktop. Desktop publishing has allowed quality brochures to be produced in-house rather than at a commercial print shop. The internet has allowed engineers to interactively participate in projects and research, despite the separation of miles. And, activities such as mail piece production and parcel shipping have found their way to the desktop as well.

Mail piece production, in the business environment, has traditionally been a product of several departments. Accounting produces a billing that is stuffed into envelopes; the envelopes are weighed as they are fed to a postage meter; and, a postage meter prints postage to the individual envelopes as a function of the weight and postal rate tables. This basic sequence is still the way that businesses produce billings on a month-to-month basis. However, the steps between printing of the mail piece contents, stuffing of the envelopes, weighing, and printing of a postage indicia have become quicker, more streamlined, and more accessible.

Parcel shipping, though following a different sequence of steps than mail piece production, also has benefitted from desktop production efficiencies. Labels can be printed at the desktop, weighing scales are interconnected to PCs for inputting weight to a parcel shipping application, and manifests for recording the details of parcel pickup and delivery are printed at the desktop as well. Peripherals such as scanners and other input devices can also be added for increased data delivery.

Mailing and shipping applications still rely on an important piece of data in determining the cost of shipment; that piece of data is weight. Programs have been developed that print postage to an envelope at the desktop, but these programs still require a weighing device to input that parameter into an algorithm that will determine the proper postage rate to be applied when producing a postage indicia. An exception to a weight-based need is when the postage is set at a constant value and the weight of the mail piece is estimated; this exception is particularly susceptible to human error because of the estimation involved. Parcel shipping, in particular, is tied to the weight parameter in determining a cost for shipping a parcel because of the profusion of services available from individual carriers and the fact that parcels tend to be of varied weight and size.

Some developed technology has attempted to eliminate the need for utilizing a weighing scale for inputting the weight parameter in determining postage charges. One such method and system has been disclosed in U.S. Pat. No. 5,983,209 for a SYSTEM AND METHOD FOR DETERMINATION OF POSTAL ITEM WEIGHT BY CONTEXT issued Nov. 9, 1999 to Salim G. Kara (hereinafter referred to as Kara). In Kara, parameters are input into the system that are associated with the context in which the mail piece is generated; the parameters can be manually input or can be input by the application which is generating the associated mail piece.

One drawback to Kara is the flexibility of the disclosed system. Kara is specifically drawn to "postal items" and thus does not address the issues associated with carrier management systems that require more varied input in addition to performing rate shopping among multiple carriers. Kara, though providing access to a resident database for determining component weights in calculating postage values does not provide a means of accessing non-resident databases; nor does Kara provide a means for training its resident database so as to provide a greater range of rating variables.

Another example of parameter-based charging for mail piece production is disclosed in U.S. Pat. No. 5,873,073 for a METHOD AND SYSTEM FOR MAIL PIECE PRODUCTION UTILIZING A DATA CENTER AND INTER-RELATED COMMUNICATION NETWORKS issued Feb. 16, 1999 to Bresnan et al. (hereinafter referred to as Bresnan). Bresnan discloses a method for producing finished mail pieces wherein the characteristics of the mail piece are input at a first node and the individual mail pieces are produced at a second or subsequent nodes. A cost is associated with each parameter that defines production of the mail piece and a total cost for the production is calculated.

Bresnan provides for building a final cost, akin to the postal value as determined by Kara, but does not address the issue of bringing the full parcel shipping application to the desktop; rather, Bresnan serves as a means of remote production.

Based on the aforementioned needs in the art, it is an object of the present invention to provide a means of reducing reliance on weighing scales, to the extent of even eliminating their use, by supplying a weight parameter to shipping and parcel manifest applications. It is a further object of the present invention to utilize the quickly expanding capabilities and information resources of the internet to provide a weight parameter to shipping applications and parcel processing routines. Additionally, it is a further object of the present invention to provide input to a trainable database that will further reduce reliance on input from a weighing scale.

SUMMARY OF THE INVENTION

According to the invention, the object is achieved and the disadvantages of the prior art are overcome by a method and system for non-scale based weight for use as an input in a shipping application.

The method of the invention is based upon establishing a trainable weights database in a data processing system having a shipping application. The method comprises several steps that begin with establishing a product database responsive to a weight determination routine in the shipping application. The weight of a parcel to be shipped is determined by comparing a first data entry at the shipping application with a set of data entries resident in the product database to determine a weight. If the comparison determines a weight, then the weight is returned to the shipping application; however, if the comparison does not return a weight, then a weight is determined by selecting an input option from among a set of weight input options. The determined weight is then input to the trainable weights database in respect of a set of parameters resident in the first data entry so that the determined weight can be used for subsequent transactions. The set of weight input options further comprises an auto search mode resident in the database functionality. The auto search mode performs a search, utilizing one or more search engines, based upon a set of instructions entered into the auto search mode by a system operator and established in a search routine set-up mode, which covers a network area for the purpose of returning a weight to the trainable database. If the auto search mode returns a weight, than the weight is inserted into the database for future use; however, if the auto search mode does not return a weight, then a next action is performed in respect of the instructions.

The data comparison step further comprises the steps of entering a description of the parcel to be shipped wherein the description comprises a first set of data that describes a set of contents of the parcel. The description is parsed to determine whether or not a subset of the set of data comprises a known symbology description such as UPC, or known bar code configuration. If the subset comprises a known symbology description, then the method matches the known symbology description with a locator function in the trainable weights database to locate a second set of data descriptive of the weight of the parcel to be shipped. However, if the subset does not comprise the known symbology description, then the description is further parsed into match fields.

The trainable weights database is linked to a rating server for determining a rate for shipping the parcel wherein the rate is determined by applying the weight to a carrier rate database, selecting one or more parameters that define a mode of shipment for the parcel, and determining the rate in respect of the weight and the mode of shipment. The one or more parameters defining the mode of shipment can comprise a class of service, a delivery date, or a destination zone.

The match fields further comprise fields describing: a set of dimensions for the set of contents of the parcel; a set of components of the parcel contents; or, a level of quality of the parcel contents.

The system of the present invention includes a trainable weights database residing in a data processing system having a shipping application. The system comprises data entry means for entering a set of data relative to the parcel into the data processing system. The system further comprises a set of one or more databases for saving and/or recording data relative to the products and components thereof that together form the parcel to be shipped. In addition, parsing means for parsing the set of data into data fields, together with a weight search functionality for performing a search for a weight relative to the parcel are included. If a weight is located, then the weight is returned to the shipping application for entry into a rate determining routine wherein the weight determining routine determines a rate to be charged for shipment of the parcel; and, if the weight is not located, then a weight is requested and returned via alternative weight determining means.

The resident search functionality can be an internal weight search functionality for performing the search within the set of one or more databases, can be an external weight search functionality for performing the search via a link to a network resource, or can be both. The network resource can be an internet link or an intranet link.

The alternative weight determining means can be: via interpolation of weights for elements having similar characteristics to that of the parcel contents; via entry of the weight from a weighing scale; via the data entry means; or, may be an input from an external weights database.

The method of creating a weight database training object, in an object oriented development environment of a data processing system, is an important aspect of the present invention. The method begins by establishing an object creation function within the data processing system and then registering a class within the data object creation function and naming the class. The instantiation establishes a programming interface to the weight database training object. The properties of the weight database training object are established by placing a set of object methods within the weight database training object by utilizing the programming interface, then placing internal weight search functionality within the weight database training object by utilizing the programming interface. Another step places external weight search functionality and a set of weight data tables within the weight database training object by utilizing the programming interface. A human interface, for allowing data to be displayed to a system operator under direction from the object methods, is also established and placed within the weight database training object by utilizing the programming interface.

The set of weight data tables further comprises: a plurality of symbology coded data; rules for use of weight field data; error messages; and, suggestions for alternate paths of movement within the data processing system. The set of object methods comprises action instructions which may include: display instructions for instructing the data processing system to display data on the display means; storage instructions for instructing the data processing system to store data; and, printing instructions for instructing the data processing means to print data on the output means.

Internal weight search functionality includes: a weight search engine which comprises a set of rules for applying weighting to database field tables so as to determine a weight contained within the weights database; a set of coding tables for storing UPC or similar barcode data; and a second set of coding tables for storing manufacturer and product coding. The internal weight search functionality further includes lookup instructions for looking up a UPC or similar code within a set of coding tables. The lookup is based upon a comparison of a portion of the UPC or similar symbology, entered into a data field of the host application by scanning or other data entry means, with a corresponding product field listed within the set of coding tables.

The external weight search functionality, on the other hand, provides for weight search instructions and rules for the conduct of the search (purpose of search, timing, length of search, extent of search, etc.); and, includes sets of instructions for parsing the returned weight field into subfields. Additionally, the external weight search functionality allows the weight database training object to separate unnecessary data from required weight data; this allows the creation of additional weight tables or the continuous training of the weights database to be conducted.

The method of utilizing the weight database training object, in a data processing system having a parcel shipping application, is of particular utility. The method comprises the steps of: creating a shipping document within the parcel shipping application; determining that the entry of a weight field is required within the shipping document (entry of the weight field further comprises a set of instructions for invoking the weight database training object); entering, through input means (such as a key board or scanner), the weight field into said shipping document; and, invoking the weight database training object, whereby the weight database training object performs weight determination to determine a weight to enter into a weight field of the shipping document and transmitting the weight to rate determination functionality for use in calculating a rate to be charged for shipping the parcel by a carrier. The transaction can be downloaded to output means (such as a manifest or label printer), in whole or in part, for subsequent report production.

BRIEF DESCRIPTION OF THE DRAWINGS

FIG. 5 is a block diagram of selected address headers for the weights database.

FIG. 7 is a block diagram of the weights database training object which shows a programming interface, object methods, data sets, functionality, and a human interface.

DETAILED DESCRIPTION OF THE PREFERRED EMBODIMENTS

Figure 1A:
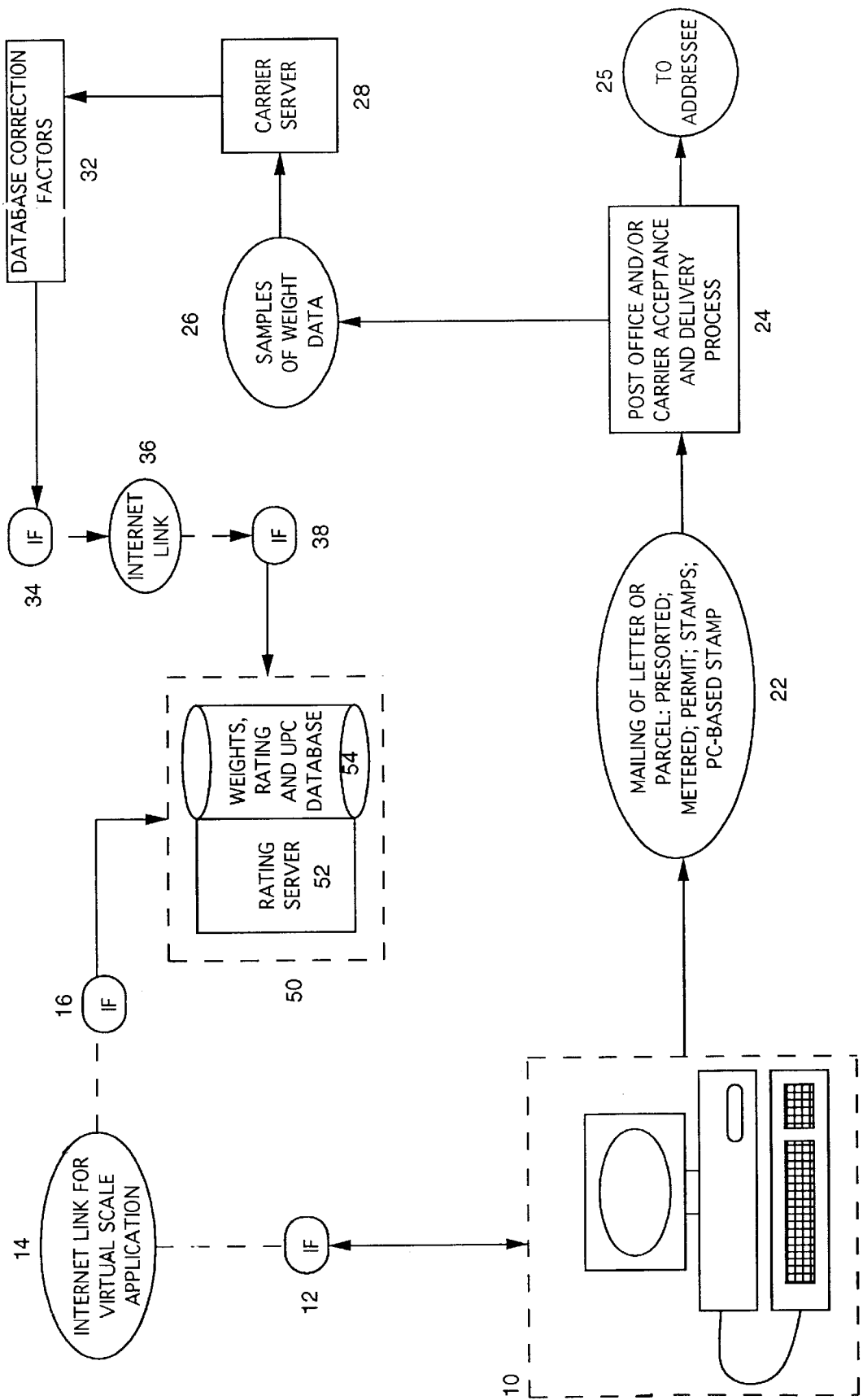
FIG. 1 is a diagram of the system of the present invention showing the flow between each of the high-level components of the system.
FIG. 1B is a diagram of a multi-node system wherein each node queries and receives input from a central data center and in turn each node transmits its manifest or postal data to a carrier for acceptance.
FIG. 1C is a block diagram of data processing node which is co-located with the data base and wherein the data processing node interfaces with a carrier server in performing rating routines prior to seeking carrier acceptance.
FIG. 1D is a diagram of a data processing node within the present invention which is part of a carrier processing and acceptance network.

Beginning with FIG. 1A, there is shown a diagram of the system of the present invention showing the flow between each of the high-level components of the system. A system user, who has a parcel or an article to be shipped via a carrier, accesses the overall system through subsystem 10.

Subsystem 10 is shown as a node which includes a personal computer for processing data and running certain software applications, a monitor for providing a human interface with the personal computer so as to view screens established by the application, and a keyboard for data entry. A modem link is implied that will allow access to interface 12. Additional peripherals that are anticipated include a scanner for scanning barcodes and similar data, as well as a weighing scale for inputting weight should the system database 54 not contain a relevant weight for the article to be shipped.

Interface 12 links subsystem 10 with the internet through an internet link 14. Interface 12 is of a conventional type that includes a web browser and a modem. The internet link 14 is of a type commercially available through such companies as America-On-Line and is linked to a trainable database 54 through interface 16 which includes a communication link such as a modem.

Database 54 is optionally linked to a rating server 52 to form subsystem 50. Subsystem 50 is a remote server which can determine a rate for shipping a parcel in accordance with parameters established in the shipping application hosted by subsystem 10 and a weight returned from database 54. Database 54 can be updated by data entry from subsystem 10 or from periodic and/or random updates transmitted by carrier server 28 and corrected or refined by database correction factors 32.

There are a number of commercially available databases that can serve as input to the trainable database 54, thus reducing training time and expense. Those databases representing portions of the Universal Product Code (UPC) and the European Article Numbering (EAN) systems are the most advantageous because they contain product descriptions and characteristics. Currently, portions of these systems are commercially available, while a complete compilation is not available. The trainable database contemplated herein would provide the quickest road to actually building a database that anticipates the entire UPC product base.

The Universal Product Code was the first bar code symbology widely adopted and began its commercial life on Apr. 3, 1973 when the grocery industry adopted the UPC as its standard for product marking. Versions of the UPC outside North America began with the adoption of the EAN in December 1976.

The requirements for the Universal Product Code (UPC) symbols are outlined by the American National Standards Institute (ANSI) and are maintained in the United States by ANSI and in Canada by the Electronic Commerce Council of Canada (ECCC). The UPC symbol database, as well as its equivalents outside North America, (i.e., the European Article Numbering system utilizing thirteen (13) digit EAN numbers, the Japanese Article Numbering system utilizing thirteen (13) digit JAN numbers, etc.), are prominent throughout retailing and in particular within the grocery industry. The European Article Numbering System (EAN), the Japanese Article Numbering System (JAN), and the International Article Numbering System (IAN) are identical to the UPC except for the number of digits utilized. Currently, the UPC product base contains in excess of 100,000 separate products that are categorized by manufacturer, product type, and shipping container (both standard and unique).

There are two major classifications of UPC code and three minor ones; the two major classifications are the UPC type A code which consists of twelve (12) digits and the UPC type E code which consists of eight (8) digits and is used for those applications where space is limited or restricted. UPC type A symbols have ten (10) digits plus two (2) overhead digits; its EAN counterpart has twelve (12) digits and one (1) overhead digit. The EAN utilizes the first two characters to designate the country of origin of a product. It should be noted that barcode scanning devices equipped to read EAN symbology can read UPC symbols as well; the reverse is not necessarily true however.

The first overhead digit of a UPC type A symbol is a number related to the type of product as follows:

0=normal UPC code
1=reserved
2=products sold by weight
3=health related products
4=UPC code used without limits
5=coupons
6=normal UPC code
7=normal UPC code
8=reserved
9=reserved In June of 1997, the Uniform Code Council announced that the UPC will be phased out by the year 2005 because the twelve (12) digit UPC will run out of numbers. At that time, the United States will adopt the thirteen (13) digit EAN.

It is not necessary that the UPC and EAN specifications be listed or detailed herein for a proper understanding of the present invention.

Returning to FIG. 1A, subsystem 10 is shown as also linked to the postal or carrier stream through activities 22 which include the physical mailing of a letter or the shipping of a parcel. The entry of a letter or a parcel into the postal or carrier stream allows the carrier to apply an acceptance and delivery process 24 which produces samples of weight data 26 which are input to carrier server 28. In turn, the carrier server 28 applies database correction factors to the collected weight data so that the weight can be input to the trainable database 54 through interface 34, internet link 36 and interface 38.

Figure 1B:
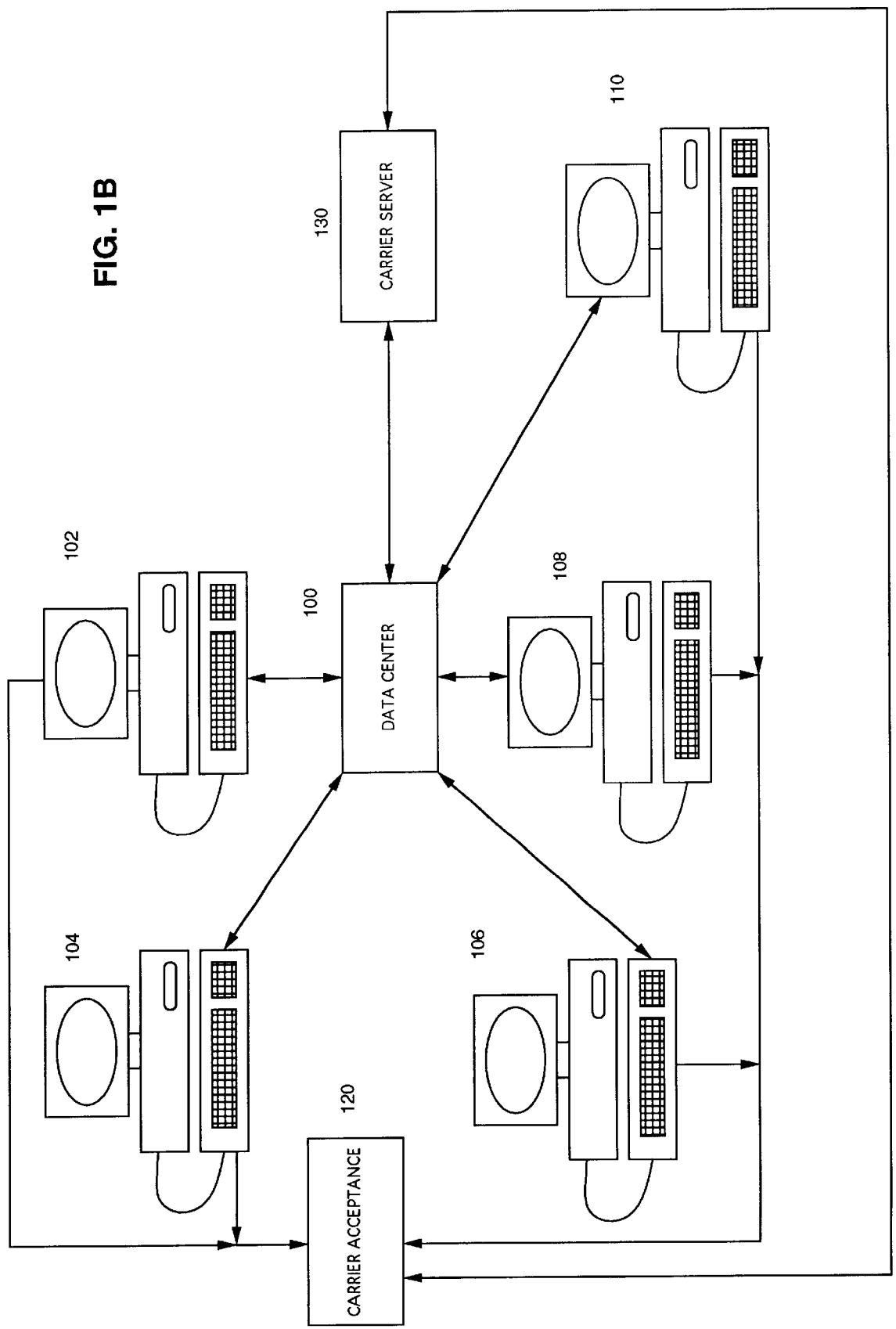

A second embodiment of the present invention is detailed in FIG. 1 B, which is a diagram of a multi-node system wherein each node queries and receives input from a centralized data center 100; and, in turn, each node transmits its manifest or postal data to a carrier for acceptance.

Data center 100 is shown as the focal point of a network that includes one or more entry nodes 102, 104, 106, 108, and 110. These nodes are depicted by way of illustration only as it is within the contemplation of this invention that there be one or more entry points into a system that includes data center 100.

Each of the entry nodes 102, 104, 106, 108, and 110 are interoperatively connected to data center 100 by communication links, as well as to the carrier acceptance application 120 which can be remote to the data center 100 or co-located with it. Additionally, a carrier server 130 is provided which administers the database routines for the data center 100 and the carrier acceptance criteria 120. Carrier acceptance criteria 120 allows the carrier to apply an acceptance and delivery process which produces samples of weight data which are input to carrier server 130. In turn, the carrier server 130 applies database correction factors to the collected weight data so that the weight can be input to the trainable database within data center 100. Carrier server 130 can be co-located with either carrier acceptance criteria 120 or data center 100 or both.

Figure 1C:
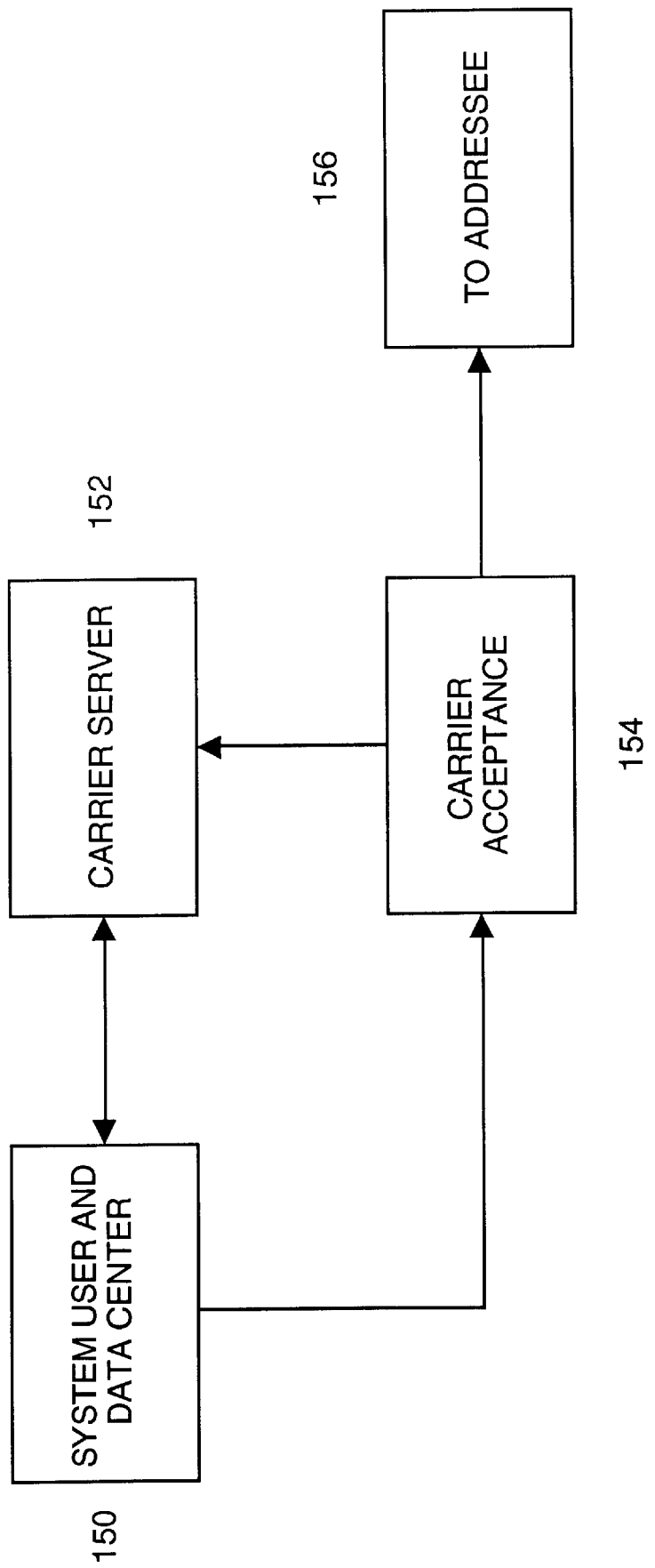

A third embodiment of the present invention is shown in FIG. 1C. FIG. 1C is a block diagram of a data processing node which is co-located with the data base and wherein the data processing node interfaces with a carrier server in performing rating routines prior to seeking carrier acceptance.

A system user is shown co-located with a data center as element 150. Element 150 may take on one of three embodiments. The first embodiment is a desktop configuration utilizing a PC with at least an operating system, a shipping or carrier management software application, communication links, and a data base with related access means for accessing weight data. The second embodiment contemplated is a kiosk wherein the configuration contains the same elements as with the desktop configuration but are housed in a kiosk to provide a retail function wherein the packages are rated and deposited for entry into the carrier traffic stream. The kiosk would be provided with a billing or cash acceptance system so that the cost of shipping could be accounted for at the kiosk. Additionally, a receipt establishing and printing means would give the system user a record of the transaction. The third embodiment is an over-the-counter configuration wherein each of the elements present in the desktop or kiosk configurations are present as well, but the elements are accessed from a counter-top in a retail store environment.

System user and data center 150 is connected to carrier server 152 which provides a rating and services database to the system user via communication links which may be telephone based, internet based, or line based. Carrier acceptance routine 154 is configured to receive data from the system user, and apply an acceptance routine to determine of the electronic manifest or shipping data received from the system user and data center is acceptable as determined by the carrier's acceptance criteria. The carrier acceptance routine, which may be remote to the carrier server or co-located with it, then transmits the data to the carrier server for tracking or recording which allows the carrier to accept the parcel to be shipped to the addressee 156.

A fourth embodiment of the present invention is shown in FIG. 1D. FIG. 1D is a diagram of a data processing node within the present invention which is part of a carrier processing and acceptance network.

User station 170 serves as a first node for the system and transmits a request for a weight and a corresponding rate to weights database 172. Rates database 172 determines an appropriate weight based upon input at user station 170 and then queries rating database 174 for a rate corresponding to the weight and any services requested by the user station 170. The rate is transmitted by rating database 174 back to the user station 170 through weights database 172, though it is contemplated that the transmission of the appropriate rate could be tranmitted by the rating database 174 directly to the user station 170.

User station 170 submits the parcel to be shipped, together with its corresponding rate charge, to the carrier acceptance procedure 178. The carrier acceptance procedure transmits details of the transaction to the carrier server 176 for subsequent parcel tracking, possible billing, and/or statistical analysis. The parcel, upon clearing the carrier acceptance procedure, is then placed into the carriage stream 180 where it is shipped to the addressee.

Figure 2A:
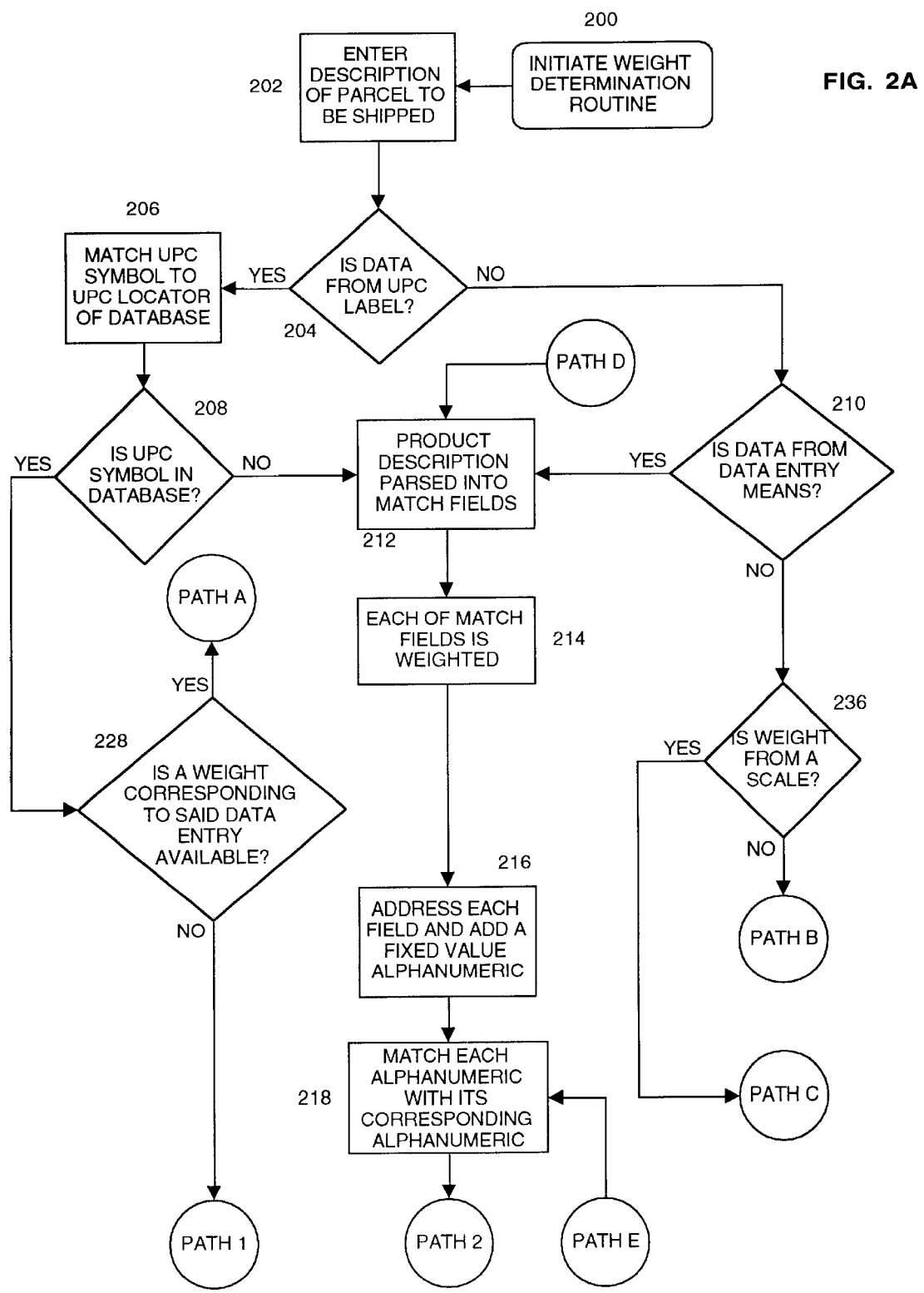
FIG. 2A Is a detailed flowchart of the method of establishing the weights database and for comparing elements of a product description with elements of the database field to determine a match and its associated weight.

Turning to FIG. 2A, there is shown the method of the preferred embodiment of the present invention. The method begins at step 200 with the initiation of a shipping or carrier management application (hereinafter referred to as a shipping application) in a data processing system. The application can be configured to access carrier data representative of one carrier, or in the alternative, can be configured to select fom among two or more carriers as based upon selection criteria selected by a system user. For example, such criteria can include: cost; desired date of delivery; available services; or, shipping mode.

From step 200, the method advances to step 202 where data relative to the parcel to be shipped is entered into a weight determination routine of the shipping application. The data can be entered by a system operator utilizing a keyboard, by scanning a barcode related to the contents of the parcel, or by other similar data entry methods. When the data has been entered, the method advances to the query at step 204 which asks if the data entered is from a UPC or similar symbology label or field (hereinafter referred to as "product code"). If the response the query is "YES," then the method advances to step 206 where the product code is matched to the weights database through the use of a locator or search engine. From step 206, the method advances to the query at step 208 which asks whether or not a product code has been located within the weights database. If the response to the query is "NO," then the method advances step 212 where the product description, as identified by either the corresponding product code or supplemental data entry, is parsed into match fields. If, however, the response to the query at step 208 is "YES," then the method advances to the query at step 228. At step 228, the method further queries as to whether or not a weight corresponding to the data entry is available in the database. If the response to the query is "YES," then the method advances along path A to re-enter the method flow at step 252 as is shown in FIG. 2C. However, if the response to the query at step 228 is "NO," then the method advances along path 1 to re-enter the method flow at the query of step 230 as is shown in FIG. 2B.

Returning to the query at step 204, if the response is "NO," then the method advances to step 210 where the method queries as to whether or not data entry is from data entry means (such as a keyboard, OCR, or data link of varied type) other than a weighing scale. If the response to the query is "NO," then the method advances to the query at step 236 which asks if the data entered is a weight value from a weighing scale. If the response is "NO," then the method advances along path B to re-enter the method flow at step 252 as is shown in FIG. 2C. However, if the response to the query at step 236 is "YES," then the method advances along path C to re-enter the method flow at step 248 as is shown in FIG. 2C.

Returning back to the query at step 210, if the response is "YES," then the method advances to step 212. At step 212, the product description is parsed into matching fields before advancing to step 214 where each of the fields is weighted in accordance with its ability to define or direct a search to a product or article in terms of its actual weight (additionally at step 212, path D is seen re-entering the method flow from step 230 as is shown in FIG. 2B). From step 214, the method advances to step 216 where an address is assigned to each field and a fixed value alphanumeric is added that corresponds to a product description in the weights database. At step 218, each of the alphanumerics is matched against the most appropriate table (based on the alphanumerics) in the weights database to determine whether a match is to be returned (additionally at step 218, path E is seen re-entering the method flow from step 226 as is shown in FIG. 2B). From step 218, the method advances along path 2 to re-enter the system flow at step 220 as is shown in FIG. 2B.

Figure 2B:
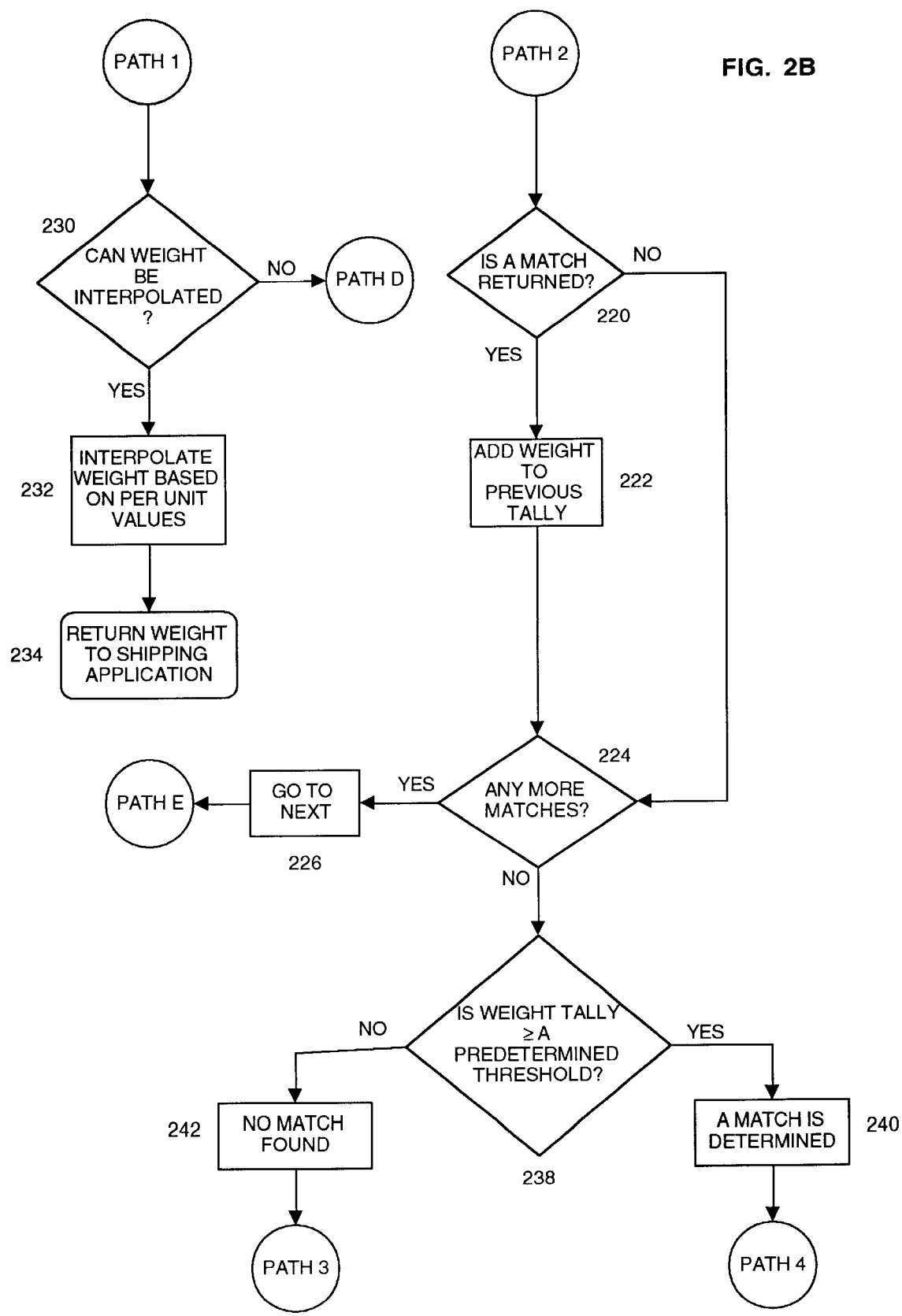
FIG. 2B Is a continuation of the flowchart of FIG. 2A which details the flow of the method of establishing and utilizing the weights database.
Figure 2C:
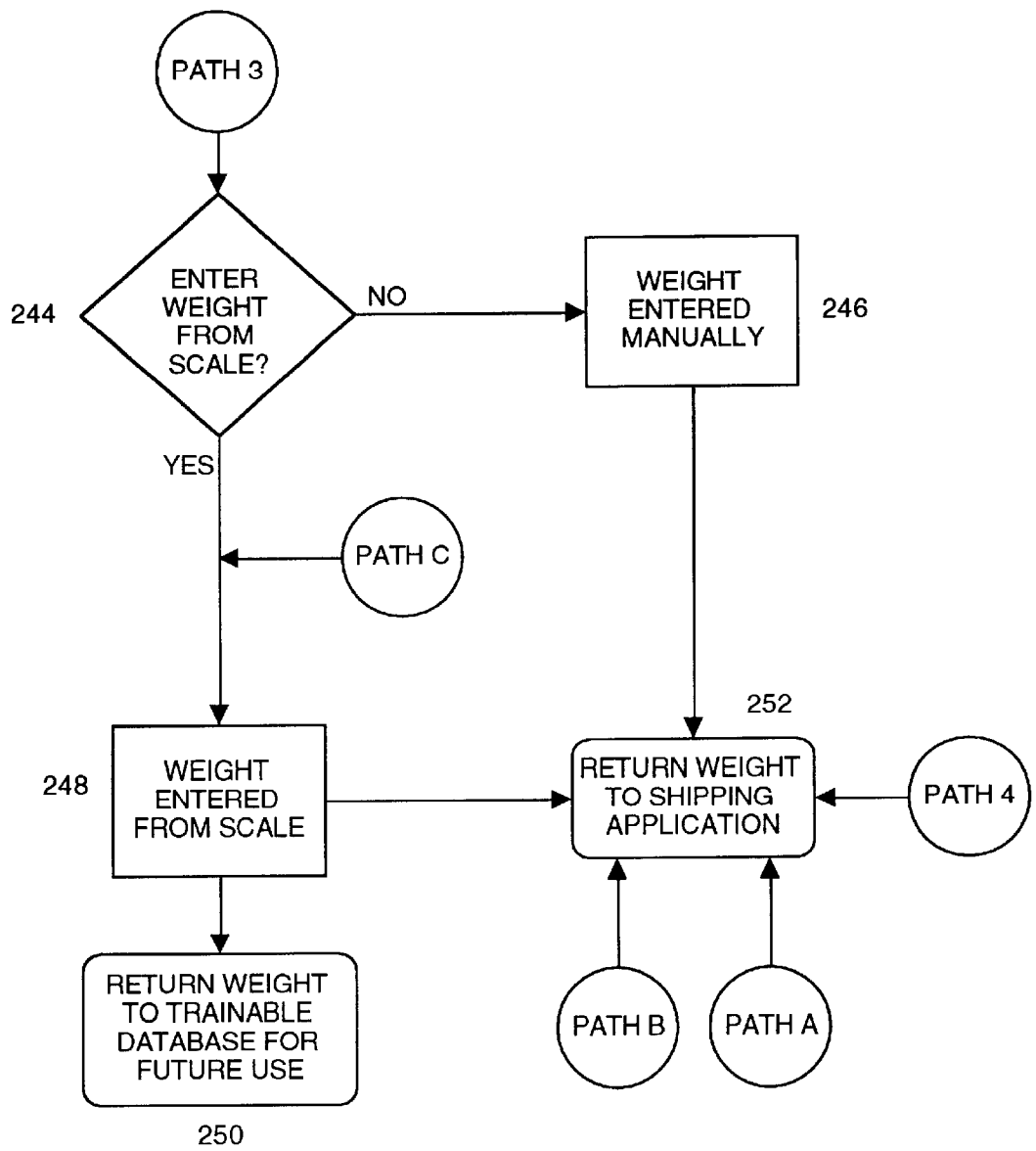
FIG. 2C Is a continuation of the flowchart of FIG. 2B which details the flow of the method of establishing and utilizing the weights database.

Moving next to FIG. 2B, there is shown path 1 re-entering the method flow at step 230 and path 2 re-entering the flow at step 220.

Turning to step 230, the method asks if the weight can be interpolated. Interpolation is required if the weight in the database is associated with a unit size or measurement that differs from that of the product for which a weight is sought. If the response to the query is "NO," then the method returns along path D to step 212 as is shown in FIG. 2A. However, if the response to the query is "YES," then the method advances to step 232 where the weight is interpolated as based upon per unit values and the weight is returned to the shipping application at step 234.

Returning to step 220, the method queries as to whether or not a match is returned after comparing the alphanumerics identifying the parcel to be shipped with those of the available fields in the weight database. If the response to the query is "YES," then the weight of that alphanumeric is added to a weights tally field in step 222. If the response to the query is "NO," then the method advances to the query at step 224 which asks if there are any more matches. If the response to the query is "YES," then the method advances to step 226 where the method goes to the next alphanumeric to be matched by traveling along path E to return to step 218 as is shown in FIG. 2A. However, if the response to the query at step 224 is "NO," then the method advances to step 238 and determines whether or not the total weight recorded in the weight tally field is greater than, or equal to, a pre-determined threshold weight.

If the weight in the weight tally field is not greater than or equal to the threshold weight, then the method advances to step 242, determines that no match has been found at step 238 and then advances to step 244 along path 3 as is shown in FIG. 2C. If it is determined that the weight in the weight tally field is greater than or equal to the threshold weight, then the method will advance from step 238 to step 240. The method determines at step 240 that a match has been determined and then advances via path 4 to step 252 as is shown in FIG. 2C.

In FIG. 2C, path 3 is shown re-entering the method flow at step 244. At step 244, the method queries as to whether or not the parcel weight is to be entered from a weighing scale. If the response to the query is "YES," then the method advances to step 248 where the weight is entered from the scale before being returned to the database at step 250 for future use; the database will assign the weight to a product field based upon its input parameters. Essentially simultaneously with the advance to step 250, the method will return the weight to the shipping application at step 252 for use in determining the rate to be charged for shipping of the parcel. Additionally, path C, coming from step 236, re-enters the method flow just before step 248. Returning to step 244, if the response to the query is "NO," then the weight is entered manually at step 246 before advancing to step 252.

At step 252, the weight is returned to the shipping application for use in determining the rate to be charged for shipping of the parcel. Additionally, path A, coming from step 228, and path B coming from step 236, both as shown in FIG. 2A, and path 4 coming from step 240 as is shown in FIG. 2B, re-enter the method flow at step 252.

Figure 3:
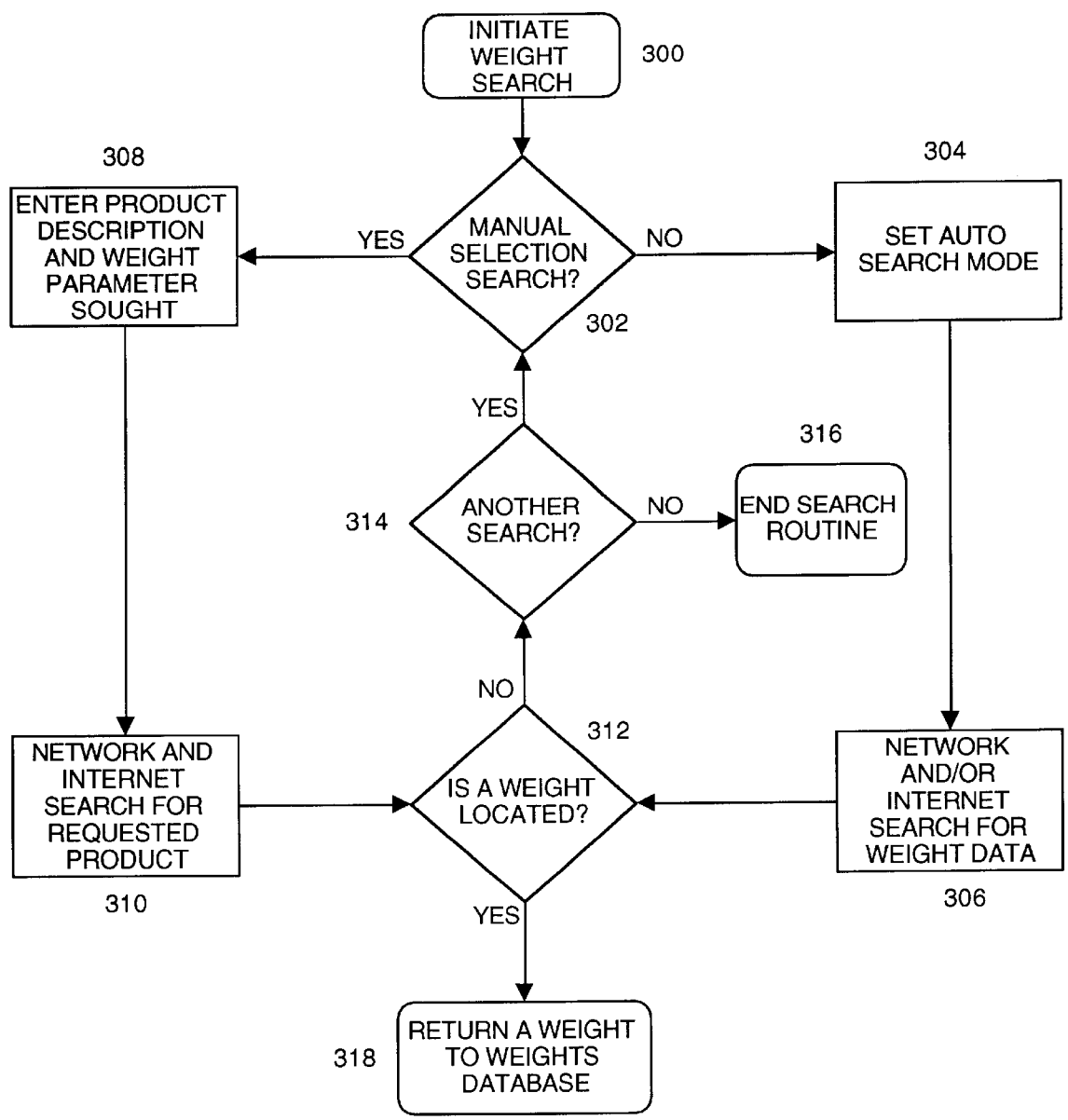
FIG. 3 is a flowchart of the method for performing a dynamic search for a weight and the returning of that weight to the weights database.

Turning to FIG. 3, there is shown a flowchart of the method of performing an external search for a weight while utilizing the internet, intranet, or similar netwirk capability.

The method begins at step 300 with a request to the shipping application, or to the database search functionality, to perform an external weight search. The purpose of the search is to supplement the weights database by searching for weight data to be used to train the database. From step 300, the method advances to the query at step 302 which asks whether or not a manual selection search is to be conducted. This type of search is based upon one-time parameters entered at the time of the search request. These parameters correspond to a particular parcel to be shipped. If the response to the query is "YES," then the method advances to step 308 where the product (parcel) description is entered and the particular weight parameter required is entered. The method advances from step 308 to step 310 where the search is requested before advancing to the query at step 312.

Returning to the query at step 302, if the response is "NO," then the method advances to step 304 where an auto search mode (ASM) is requested. The ASM can be configured to run in a variety of modes; these include, but are not limited to, search during a specific time period; search for a return of all weights found; or, a search for specific product weights. The search is conducted at step 306 before advancing to the query at step 312.

At step 312, the method queries as to whether or not a weight has been located. If the response to the query is "YES," then the method returns the weight, at step 318, to the weights database for future use. However, if the response to the query at step 312 is "NO," then the method advances to the query at step 314. Step 314 queries as to whether or not another search is to be performed. If the response to the query is "NO," then the method advances to step 316 where the search routine is ended; otherwise, if the response to the query is "YES," then the method returns to step 302 to determine the search type.

Figure 4:
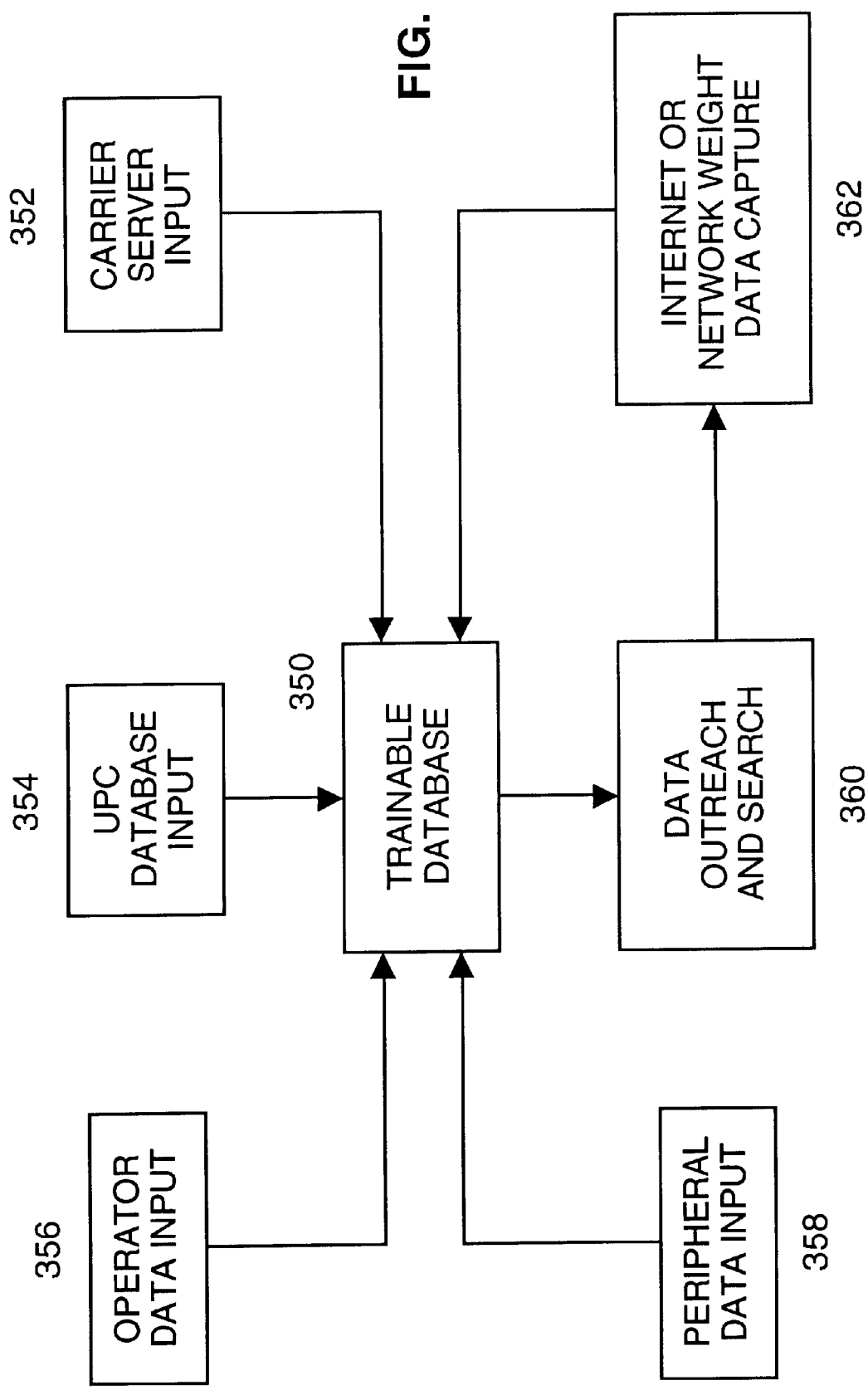
FIG. 4 is a block diagram of the inputs to the weights database.

Turning to FIG. 4, there is shown in block form, the preferred input embodiments for adding or training the weights database 350. Inputs include: a carrier server input 352 which adds carrier determined weights for specific parcel types to the weights database 350; a UPC database input 354 which includes the subsets of the UPC database which are commercially available for certain industry groupings; an operator data input 356 which includes manually entered weight values; peripheral data input 358 from a weighing scale, scanner entry, or additional database ; and, a data outreach input 360. The data outreach input 360 initiates the internet or network weight data capture 362 further described in FIG. 3 hereinabove.

Turning to FIG. 5, there is shown an example of the address headers to which a weight search is directed. Database file 400 is shown having an input interface 402 which allows access to the database based upon methodolgies further described in FIG. 6 and in FIG. 7. Input interface 402, allows the alphanumerics assigned to the parcel to be shipped to be matched against: data 412, 416, or 418 which includes UPC, EAN, and/or similar symbology respectively; and, product code 414 parsed from the associated symbology. Additionally, input interface 402, allows a match to be conducted against: weight tables found in table 422 generally; or, more specifically against weight by unit of size tables 424; weight by package type tables 426; and, weight by product type tables 428.

Input interface 402 is further capable of matching alphanumerics in data tables by manufacturer tables 430 generally; or, more specifically, by address tables 432; by product line data 434; or, by industry data 436. And, input interface 402 is capable of matching alphanumerics with product description tables 404, as further defined by dimensional parameters 406, dimensional weight tables 408, and product category tables 410.

Each of the above tables is assigned a weight value for use in determining a weight to be returned by the method as further described in steps 212 through 218 as shown in FIG. 2A.

Figure 6:
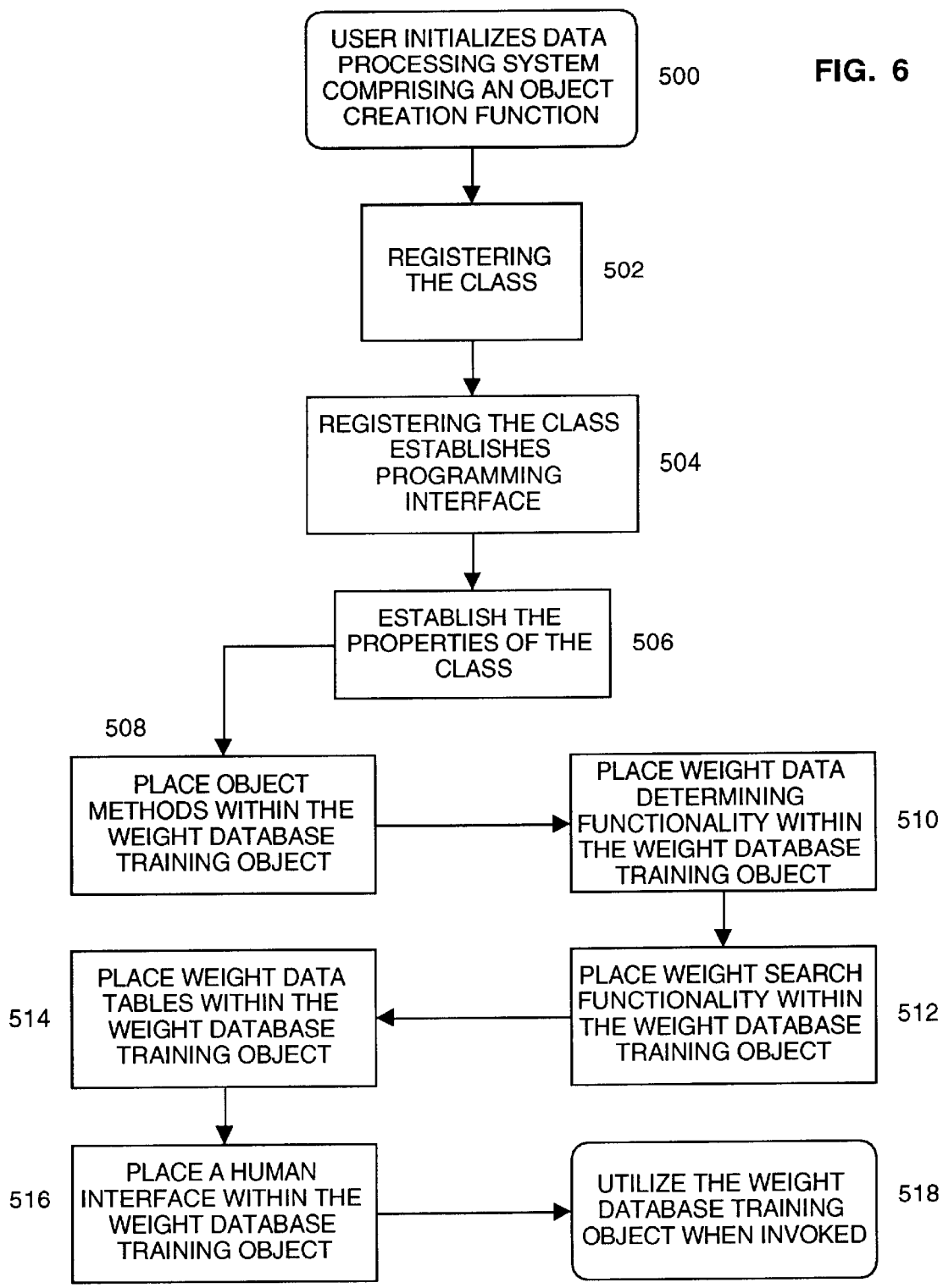
FIG. 6 is a flowchart of the method of creating the weights database training object.

Turning to FIG. 6, there is shown a flowchart of the method utilized to create the weight database training object 600. A detailed discussion of object oriented programming is not required for a full understanding of the method described hereunder.

The creation of the weight database training object 600 begins at step 500 when a system user initializes a data processing system which has an object creation functionality resident therein. From step 500, the method advances to step 502 where the method instantiates a weight database training object by registering an object class with the object creation functionality. Registration of the class creates, at step 504, a programming interface that will be used as a port of entry into the object. The port of entry will allow the system to place class properties within the object. The system user will determine the properties of the class at step 506. The specific properties of the weight database training object are further discussed in the description of FIG. 7.

From step 506, the method advances to step 508 where object methods are placed within the weight database training object by entering them through the programming interface. The method then advances to step 510 where weight data determining/search functionality is placed within the weight database training object by entering it through the programming interface. In succession, external weight search functionality, weight data tables, and a human interface are placed within the weight database training object by entering them through the programming interface in steps 512, 514, and 516 respectively. It should be noted that steps 508 through 516 can be performed in any order so long as each of the step actions are performed prior to utilization of the object.

When the properties of the weight database training object 600 have been placed into the object, the method advances to step 518 where the weight database training object can be used for its intended purpose when invoked. The use of the weight database training object 600 reduces the steps necessary to apply weight determining and weight search functionality and is thus a significant improvement over the prior art. The properties of the weight database training object will now be discussed in detail with reference to FIG. 7.

Turning to FIG. 7, there is shown a block diagram of the weight database training object 600 and its constituent sub-elements.

The weight database training object 600 contains a programming interface 602 which serves as the portal by which properties of the weight database training object 600 can be entered into it. The programming interface 602 is returned by the data processing system when the weight database training object 600 is instantiated, thus allowing the weight database training object 600 to be invoked as needed.

In applications such as Visual Basic, an object oriented designer would use a command such as "createobject" to instantiate the object. The "createobject" command returns a programming interface such as "interface.___" which will allow the designer to place the necessary properties into the object by entering their file name after the interface command.

The weight database training object 600 has specific requirements; therefore, through the programming interface 602 will come: a human interface 616; internal weight search functionality 604; external weight search functionality 614; a set of weight data tables 606–606n; and, a set of methods comprising internet search method 608, storage method 610, and weight look-up method 612. Each of these elements is described in more detail hereinbelow.

Human interface 616 allows weight database training object 600 to provide a visual interface to the system user if such is required within the host application; additionally, printing methods 612 as contained in weight database training object 600 cause human interface 616 to direct a printer, such as might be resident within subsystem 10, to print data under the direction of the object. Thus, the purpose of human interface 516 is to provide the path for user interface functionality.

Additional functionality for weight database training object 600 is provided by internal weight search functionality 604 and external weight search functionality 614. Each of these performs a unique role. Internal weight search functionality 604 includes: a weight search engine which comprises a set of rules for applying weighting to database field tables so as to determine a weight contained within the weights database; a set of coding tables for storing UPC or similar barcode data; and a second set of coding tables for storing manufacturer and product coding. Internal weight search functionality 604 further includes lookup instructions for looking up a UPC or similar code within a set of coding tables. The lookup is based upon a comparison of a portion of the UPC or similar symbology, entered into a data field of the host application by scanning or other data entry means, with a corresponding product field listed within the set of coding tables. External weight search functionality 614, on the other hand, provides for weight search instructions and rules for the conduct of the search (purpose of search, timing, length of search, extent of search, etc.); and sets of instructions for parsing the returned weight field into subfields. Additionally, external weight search functionality 614 allows weight database training object 600 to separate unnecessary data from required weight data; this allows the creation of additional weight tables or the continuous training of the weights database to be conducted.

Weight data tables 606–606n provide much of the weight data utilized by the weight database training object 600. Weight data tables 606–606n include a number of fields from which an optimal weight will be determined and returned by weight database training object 600; these tables further include: a table of all weights associated with particular products in variant form; error messages; and suggestions for alternate paths of movement within data processing subsystem 10.

Paths of movement are further dictated by weight database training object 600 through the use of its distinct method elements. Internet search method 608 is used for instructing the data processing subsystem 10 to display data on an associated monitor. Storage method 610 is used for maintaining instructions for the data processing subsystem 10 or system 50 (by way of example) to store data in its associated memory or within a peripheral device. Weight look-up method 612 is used for instructing the data processing system to conduct its search of the weights database so as to be able to return a valid weight to the application.

While certain embodiments have been described above in terms of the system within which the weight database training object methods may reside, the invention is not limited to such a context. The system shown in FIG. 1A is one example of a host system for the invention, and the system elements are intended merely to exemplify the type of peripherals and software components that can be used with the invention. Additionally, FIG. 4 is an example of an input system for the trainable database, and the input elements are intended merely to exemplify the data sources that can be utilized to dynamically build the invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of establishing a trainable weights database in a data processing system having a shipping application, said method comprising the steps of:
   (a) establishing a product database responsive to a weight determination routine in said shipping application;
   (b) comparing a first data entry at said shipping application with a set of data entries resident in said product database to determine a weight for a parcel to be shipped, and:
      (i) if said comparison determines a weight then returning said weight to said shipping application; and
      (ii) if said comparison does not return a weight then determining a weight input option from among a set of weight input options; and
   (c) inputting said determined weight to said trainable weights database in respect of a set of parameters resident in said first data entry so that said determined weight can be used for subsequent transactions.

2. The method of claim 1, wherein said weight input option further comprises an auto search mode resident in said database functionality wherein said auto search mode performs a search, based upon a set of instructions entered into said auto search mode by a system operator, and wherein said search covers a network area for the purpose of returning said weight to said trainable database; and
   (a) if said auto search mode returns a weight, than inserting said weight into said data base for future use, and
   (b) if said auto search mode does not return a weight, then performing a next action in respect of said instructions.

3. The method of claim 1, wherein said auto search mode comprises one or more search engines.

4. The method of claim 2, wherein said auto search mode is configured to search a network as based upon parameters established in a search routine set-up mode.

5. The method of claim 1 wherein said trainable weights database is linked to a rating server for determining a rate for shipping said parcel wherein said rate is determined by:
   (a) applying said weight to a carrier rate database;
   (b) selecting one or more parameters that define a mode of shipment for said parcel;
   (c) determining said rate in respect of said weight and said mode of shipment.

6. The method of claim 5, wherein said one or more parameters comprise a class of service.

7. The method of claim 5, wherein said one or more parameters comprise a delivery date.

8. The method of claim 5, wherein said one or more parameters comprise a destination zone.

9. The method of claim 1, wherein said comparison step further comprises the steps of:
   (a) entering a description of said parcel to be shipped wherein said description comprises a first set of data that describes a set of contents of said parcel;
   (b) parsing said description to determine whether or not a subset of said set of data comprises a known symbology description; and
      (i) if said subset comprises said known symbology description, then matching said known symbology description with a locator function in said trainable weights database to locate a second set of data descriptive of said weight of said parcel to be shipped; and
      (ii) if said subset does not comprise said known symbology description then further parsing said description into match fields.

10. The method of claim 9, wherein said match fields further comprise fields describing a set of dimensions for said set of contents of said parcel.

11. The method of claim 9, wherein said match fields further comprise fields describing a set of components of said set of contents of said parcel.

12. The method of claim 9, wherein said match fields further comprise fields describing a level of quality of said set of contents of said parcel.

13. A system for determining a weight for a parcel to be shipped, said system including a trainable weights database residing in a data processing system, said data processing system having a shipping application, said system comprising:
 (a) data entry means for entering a set of data relative to said parcel into said data processing system;
 (b) a set of one or more databases for saving and/or recording data relative to products and components thereof;
 (c) parsing means for parsing said set of data into data fields;
 (d) weight search functionality for performing a search for a weight relative to said parcel; and,
  (i) if a weight is located, then returning said weight to said shipping application for entry into a rate determining routine wherein said weight determining routine is for determining a rate to be charged for shipment of said parcel; and
  (ii) if said weight is not located, then requesting said weight be returned via alternative weight determining means.

14. The system of claim 13, wherein said search functionality is an internal weight search functionality for performing said search within said set of one or more databases.

15. The method of claim 13, wherein said search functionality is an external weight search functionality for performing said search via a link to a network resource.

16. The method of claim 15, wherein said network resource is via an internet link.

17. The method of claim 15, wherein said network resource is via an intranet link.

18. The method of claim 13, wherein said alternative weight determining means is via interpolation of weights for elements having similar characteristics.

19. The method of claim 13, wherein said alternative weight determining means is via entry of said weight from a weighing scale.

20. The method of claim 13, wherein said alternative weight determining means is via said data entry means.

21. The method of claim 13, wherein said alternative weight determining means is from an external weights database.

22. A method of creating a weight database training object, in an object oriented development environment of a data processing system, comprising the steps of:
 (a) establishing an object creation function within said data processing system;
 (b) registering a class within said data object creation function and naming said class; and, wherein said instantiation establishes a programming interface to said weight database training object;
 (c) establishing the properties of said weight database training object by:
  (i) placing a set of object methods within said weight database training object by utilizing said programming interface;
  (ii) placing internal weight search functionality within the weight database training object by utilizing said programming interface;
  (iii) placing external weight search functionality within said weight database training object by utilizing said programming interface;
  (iv) placing a set of weight data tables within said weight database training object by utilizing said programming interface; and
 (d) creating a human interface, for allowing data to be displayed to a system operator under direction from said object methods, and placing said human interface within said weight database training object by utilizing said programming interface.

23. The method of claim 22, wherein said set of weight data tables further comprises:
 (a) a plurality of weight field data;
 (b) rules for use of weight field data;
 (c) error messages; and
 (d) suggestions for alternate paths of movement within said data processing system.

24. The method of claim 22, wherein said set of object methods comprises action instructions; said action instructions further comprising display instructions for instructing said data processing system to display data on said display means.

25. The method of claim 22, wherein said set of object methods comprises action instructions; said action instructions further comprising storage instructions for instructing said data processing system to store data.

26. The method of claim 22, wherein said set of object methods comprises action instructions; said action instructions further comprising printing instructions for instructing said data processing means to print data on said output means.

27. The method of claim 22, wherein said internal weight search functionality further comprises:
 (a) a weight search engine which comprises a set of rules for applying weighting to database field tables so as to determine a weight contained within the weights database;
 (b) a first set of coding tables for storing UPC or similar barcode data; and
 (c) a second set of coding tables for storing manufacturer and product coding.

28. The method of claim 27, wherein said internal weight search functionality further includes lookup instructions for looking up said UPC or said similar code within said set of coding tables.

29. The method of claim 22, wherein said external weight search functionality comprises:
 (a) a set of weight search instructions;
 (b) a set of rules for the conduct of said search; and
 (c) a set of instructions for parsing a returned weight field into sub-fields.

30. The method of claim 22, wherein said address manipulation functionality further comprises:
 (a) address reconstruction functionality for the creation of a visual template for the restructuring of an address field within a data field; and
 (b) one or more sets of instructions for parsing said address field into sub-fields.

31. A method of utilizing a weight database training object, in an object oriented development environment of a data processing system having a parcel shipping application, said method comprising the steps of:
 (a) creating a shipping document within said parcel shipping application;

(b) determining that the entry of a weight field is required within said shipping document;

(c) entering, through input means, said weight field into said shipping document; and (d) invoking said weight database training object, whereby said weight database training object performs weight determination to determine a weight to enter into a weight field of said shipping document and transmitting said weight to rate determination functionality for use in calculating a rate to be charged for shipping said parcel by a carrier.

32. The method of claim 31, wherein said input means is a keyboard.

33. The method of claim 31, wherein said input means is a scanner.

34. The method of claim 31, wherein said entry of said weight field further comprises a set of instructions for invoking said weight database training object.

35. The method of claim 31, wherein said weight database training object further comprises:

(a) a programming interface;

(b) a human interface;

(c) weight data determining functionality;

(d) a set of weight data determining instructions;

(e) a set of product data tables; and (f) a set of methods comprising action instructions.

36. The method of claim 35, wherein said action instructions further comprise display instructions for instructing said data processing system to display data on said display means.

37. The method of claim 35, wherein said action instructions further comprise storage instructions for instructing said data processing system to store data.

38. The method of claim 35, wherein said action instructions further comprise printing instructions for instructing said data processing means to print data on said output means.

* * * * *